Jan. 20, 1942.  M. L. PUGH  2,270,554
BATTERY TESTER
Filed March 13, 1939  2 Sheets-Sheet 1

Inventor
Merlin L. Pugh
By Canwell & Lagaard
Attorneys

Jan. 20, 1942.  M. L. PUGH  2,270,554
BATTERY TESTER
Filed March 13, 1939  2 Sheets-Sheet 2
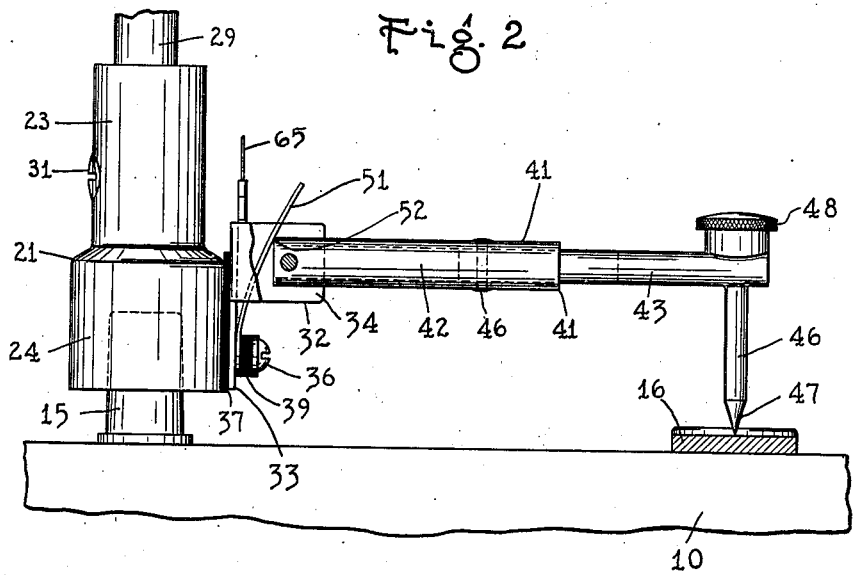
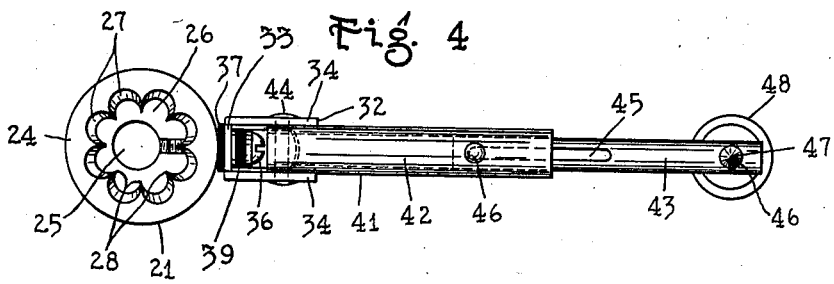
Inventor
Merlin L. Pugh
By Caswell & Lagaard
Attorneys Patented Jan. 20, 1942

2,270,554

UNITED STATES PATENT OFFICE 2,270,554

BATTERY TESTER

Merlin L. Pugh, Minneapolis, Minn., assignor to Guy L. Pugh, Minneapolis, Minn.

Application March 13, 1939, Serial No. 261,463

2 Claims. (Cl. 173—324)

My invention relates to battery testers and particularly to devices for use in connection with the testing of the condition of storage batteries such as employed with motor vehicles and the like.

An object of the invention resides in providing a tester which may be easily applied to the battery and by means of which the battery may be quickly and conveniently tested.

Another object of the invention resides in providing a tester in which two contact devices are employed and by means of which the voltage of all three cells of the battery and the discharge current thereof may be ascertained.

Another object of the invention resides in constructing the battery tester with a battery contact device comprising an attachment adapted to be easily and quickly applied to one of the terminals or posts of the battery.

Another object of the invention resides in providing an arm insulated from and movably connected to said attachment, said arm having a contact for making contact with one of the connectors of the battery.

A feature of the invention resides in insulating from and attaching to the attachment a mounting and in pivoting the arm to the mounting.

A still further object of the invention resides in constructing the arm extensible so that the contact carried thereby may be brought into engagement with the connector of the battery regardless of the type of battery and the manner of attachment of the attachment to the terminal.

A feature of the invention resides in providing resilient means for holding the contact in contact with the connector, said resilient means also serving to hold the contact out of engagement with the connector when the arm is moved away from the connector.

An object of the invention resides in constructing the attachment with a conical fluted socket providing a plurality of concentrically arranged tapered ridges adapted to be forced upon the terminal post of the battery to hold the device attached thereto.

Other objects of the invention reside in the novel combination and arrangement of parts and in the details of construction hereinafter illustrated and/or described.

In the drawings:

Fig. 2 is an elevational view of a portion of the battery shown in Fig. 1 and illustrating one of the battery contact devices.

Fig. 4 is an inverted view of the battery contact device shown in Fig. 2.

Figure 1:
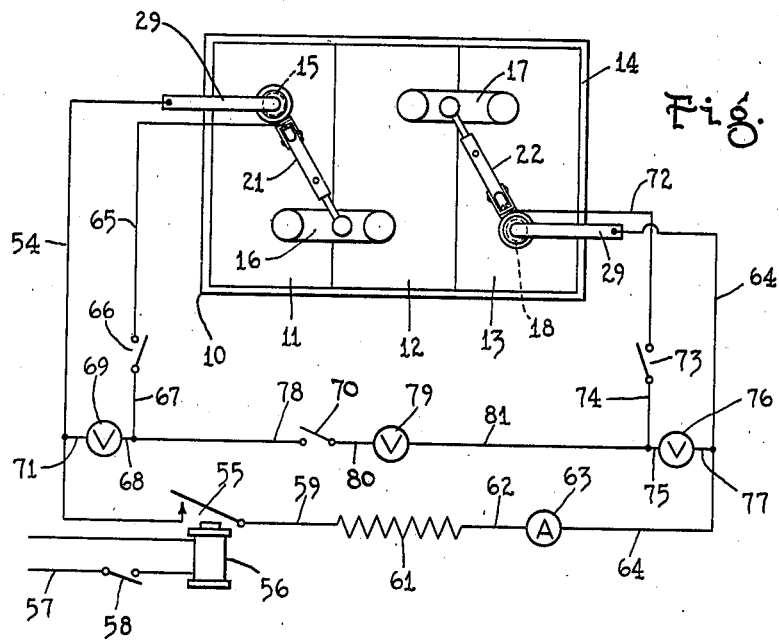
Fig. 1 is a diagrammatic view illustrating the application of my invention to a battery and showing the circuits used in connection with the invention.

For the purpose of illustrating the application of my invention I have shown in the drawings an ordinary storage battery 10 which is constructed with three cells, 11, 12 and 13 contained within an insulating case 14. One of the terminals of the cell 11 serves as one of the terminals of the battery and is indicated by the reference numeral 15. The other terminal of this cell is connected by a connector 16 with the terminal of opposite polarity of the cell 12. The other terminal of the cell 12 is connected to the terminal of opposite polarity of cell 13 by means of a connector 17. The remaining terminal of the cell 13 serves as the other terminal of the battery. This terminal is designated in Fig. 1 by the reference numeral 18.

Figure 3:
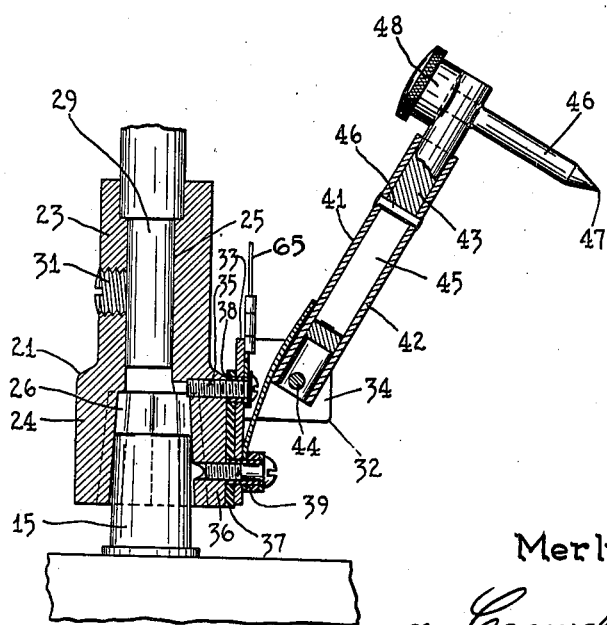
Fig. 3 is a sectional view similar to Fig. 2 showing the parts in altered position.

The invention comprises two battery contact devices 21 and 22, the device 21 being connected to the terminal 15 of the battery and the device 22 being connected to the terminal 18. These devices being identical in construction, only the battery contact device 21 will be described in detail, which is best shown in Figs. 2, 3 and 4.

The contact device 21 comprises an attachment 23 constructed of metal which is tubular in form being provided with a flared portion 24 at its lower end. The attachment 23 is provided with a bore 25 throughout the major portion thereof, which communicates with a conical socket 26 in the flared portion 24 of said attachment. The socket 26 is constructed, as best shown in Fig. 4, to provide flutes 27 extending circumferentially about the socket 26, which flutes form concentrically arranged tapered ridges 28. The dimensions of the socket 26 are such that the ridges 28, at the lower ends thereof, are spaced apart diametrally a distance greater than the diameter of the post 15 at their inner ends a distance less than the diameter of the post 15 at its free end. When the attachment 23 is forced upon the terminal or post 15 the ridges 28 bite into the same and hold the attachment secured to the terminal. In addition, the attachment 23, being constructed of metal, forms a positive contact with the terminal 15. Disposed in the bore 25 is the end of a cable 29 which is attached to the said attachment 23 and held in position within the bore 25 by means of a set screw 31.

Secured to the attachment 23 and insulated therefrom is a mounting 32. This mounting is constructed from sheet metal which is bent to form a back 33 having ears 34 extending outwardly therefrom in spaced relation. The back 33 is secured to the flared portion 24 of attachment 23 by means of two screws 35 and 36 which are threaded into the attachment 23 and which extend through the back 33. An insulating spacer 37 holds the mounting 32 out of contact with the attachment 23 and insulating sleeves 38 and washers 39 insulate the two screws 35 and 36 from the mounting 33.

Pivoted to the mounting 32 is an extensible arm 41. This arm consists of a tubular portion 42 and a rod 43 slidable within the same. A pin 44 extends through the end of the tubular portion 42 and through the two ears 34. This pin serves as a pivot on which the arm 41 may swing. The rod 43 has a slot 45 formed therein. A pin 46 extending through the tubular portion 42 and disposed within the slot 45 holds the rod 43 from rotation relative to the tubular portion 42 and at the same time guides said rod for longitudinal movement with respect to said tubular portion so that the arm 41 may be extended or retracted at will. Secured to the end of the rod 43 is a contact 46 which is constructed with a sharpened point 47 adapted to be forced into contact with the connector 16. A knob 48 on the end of the rod 43 facilitates bringing the contact 46 into and out of contact with the connector 16 and at the same time facilitates extending and retracting the arm 41 and swinging the said arm from one extreme position to the other.

The arm 41 is held in the position shown in Fig. 2 by means of a leaf spring 51. This leaf spring is secured to the back 33 of mounting 32 under the washer 39 of screw 36. When the arm is in the position shown in Fig. 2 spring 51 engages the corner 52 of the tubular portion 42 of said arm and urges the said arm to swing in a clockwise direction when viewed in Fig. 2 which causes the point 47 of contact 46 to remain in contact with the connector 16. When the arm 41 is swung to the position shown in Fig. 3 the spring 51 engages the said arm upon the outer periphery thereof and holds the arm in said position. Thus the spring 51 holds the arm in either of its two extreme positions.

My invention utilizes a number of circuits which are diagrammatically indicated in Fig. 1. Connected to the cable 29 of the contact device 21 is a conductor 54 which is connected to the switch 55 of a relay 56. Relay 56 may be operated by a circuit 57 having a switch 58 therein and containing the coil of the said relay. The circuit may be energized from any desired source and if convenient may be energized from the current of the battery 10. A conductor 59 is connected to the switch 55 and also to a resistance 61 which is used for the purpose of loading the battery 10 in arriving at the discharge current capable of being drawn from the battery. A conductor 62 connects the resistance 61 with an ammeter 63, while another conductor 64 connects said ammeter with the cable 29 of contact device 22. It will be readily comprehended that, when the switch 58 is closed, relay 56 closes switch 55 and the battery is discharged through resistance 61 and ammeter 63.

Connected to the mounting 32 of battery contact device 21 is a conductor 65 which is connected to a switch 66. This switch is connected by means of a conductor 67 to another conductor 68. Conductor 68 is connected to a volt-meter 69 which is in turn connected by means of another conductor 71 to the conductor 54. In like manner a conductor 72 is connected to the mounting 32 of contact device 22 and to a switch 73. Another conductor 74 is connected to the switch 73 and to a conductor 75 which in turn is connected to a volt-meter 76. Volt-meter 76 is connected by a conductor 77 to the conductor 64, previously referred to. The two conductors 67 and 68 are connected by a conductor 78 with a switch 70. This switch is connected by means of a conductor 80 to a volt-meter 79. Another conductor 81 is connected to the two conductors 74 and 75 and to the volt-meter 79. It will thus be seen that, when the arms 41 are brought in contact with the connectors 16 and 17 and the switches 66, 70 and 73 closed, the three volt-meters 69, 76 and 79 will indicate the voltage of the three cells 11, 12 and 13 respectively.

The method of using the invention is as follows: The two attachments 23 of the contact devices 21 and 22 are first applied to the posts or terminals of the battery. Arms 41 are then swung downwardly and extended so that the contacts 46 may be brought into contact with the connectors 16 and 17. Switches 66, 70 and 73 are next closed and readings of the voltages of the three cells taken. The battery is then loaded by closing switch 58 and the drop in voltage of the three cells carefully noted. Also the amount of current passing through the ammeter 63 is observed. Through compiled tables the condition of the battery due to the change in voltage at the three cells can be accurately determined and the condition of the battery accurately ascertained.

The advantages of my invention are manifest. The invention is extremely simple in construction and can be made to sell at a nominal price. The contact devices are easily applied and removed from the battery terminals. By means of the springs used with the contact devices the swinging arms may be held into or out of contact with the connectors with which they are associated. There is nothing complicated to get out of order with my invention and the contact devices will operate indefinitely without attention.

Changes in the specific form of my invention, as herein disclosed, may be made within the scope of what is claimed without departing from the spirit of my invention.

Having described my invention, what I claim as new and desire to protect by Letters Patent is:

1. A battery contact device comprising an attachment adapted to be secured to a terminal of a battery, a mounting insulated from and secured to said attachment, a contact arm, a pivot for pivoting said arm to said mounting, said arm being movable from contacting position with reference to a connector of a battery to a position free therefrom, and a spring carried by said mounting and engaging said arm, said spring having movement toward the axis of said pivot, said spring and arm being arranged to procure engagement between said spring and arm at a locality to one side of a plane passing through the axis of said pivot and extending substantially in the direction of movement of said spring when the arm is in one position and being arranged to procure engagement between said arm and spring at a locality on the other side of said plane when the arm is in its other position whereby the arm is urged in either of its positions by means of said spring when the arm approaches such positions.

2. A battery contact device comprising an attachment adapted to be secured to a terminal of a battery, a mounting insulated from and secured to said attachment, a contact arm, a pivot for pivoting said arm to said mounting, said arm being movable from contacting position with reference to a connector of a battery to a position free therefrom, and a spring carried by said mounting and engaging said arm, said spring engaging said arm at a locality such that when the arm is in one position it urges clockwise rotation thereof and when the arm is in another position it urges counter-clockwise rotation thereof.

MERLIN L. PUGH.